US009830436B1

(12) United States Patent
Roche (10) Patent No.: US 9,830,436 B1
(45) Date of Patent: Nov. 28, 2017

(54) MANAGING AUTHENTICATED USER ACCESS TO PUBLIC CONTENT

(71) Applicant: Google Inc., Mountain View, CA (US)

(72) Inventor: Liam Roche, Mountain View, CA (US)

(73) Assignee: Google Inc., Mountain View, CA (US)

( * ) Notice: Subject to any disclaimer, the term of this patent is extended or adjusted under 35 U.S.C. 154(b) by 216 days.

(21) Appl. No.: 14/463,462

(22) Filed: Aug. 19, 2014

(51) Int. Cl.
- H04L 29/06 (2006.01)
- G06F 21/31 (2013.01)
- G06F 21/62 (2013.01)
- H04L 12/24 (2006.01)

(52) U.S. Cl.
CPC .......... G06F 21/31 (2013.01); G06F 21/6218 (2013.01); H04L 41/509 (2013.01); G06F 2221/2141 (2013.01); G06F 2221/2149 (2013.01)

(58) Field of Classification Search
CPC ................. G06F 21/31; G06F 21/6218; G06F 2221/2149; G06F 2221/2141; H04L 41/509; H04L 63/10; H04L 63/102; H04L 63/104; H04L 63/105; H06F 21/31; H06F 21/6218; H06F 21/30; H06F 21/604; H06F 21/62; H06F 21/629
USPC ............................................................ 726/5
See application file for complete search history.

(56) References Cited

U.S. PATENT DOCUMENTS

| 7,174,462 | B2 | 2/2007 | Pering et al. |
| 8,332,937 | B1 | 12/2012 | Eger |
| 8,667,560 | B2 | 3/2014 | Albisu |
| 2011/0055912 | A1* | 3/2011 | Fusari ............... G06F 17/30893 726/8 |
| 2012/0222102 | A1 | 8/2012 | Hirose |

* cited by examiner

*Primary Examiner* — Edward Zee
*Assistant Examiner* — Chi Nguy
(74) *Attorney, Agent, or Firm* — Fish & Richardson P.C.

(57) ABSTRACT

Methods, systems, and apparatus, including computer programs encoded on a computer storage medium, for managing access to public content are disclosed. In one aspect, a method includes receiving, at a user device, first content transmitted by a first system; in response to receiving the first content, generating, by the user device, a request for second content; transmitting the request for the second content to a second system; determining, by the user device, whether the second content has successfully loaded; and in response to determining that the second content has not been successfully loaded by the user device, executing code included as part of the first content to cause a display of main display content. Other embodiments of this aspect include corresponding systems, apparatus, and computer programs, configured to perform the actions of the methods, encoded on computer storage devices.

22 Claims, 4 Drawing Sheets

MANAGING AUTHENTICATED USER ACCESS TO PUBLIC CONTENT

BACKGROUND

This specification relates to data processing and content distribution.

The Internet facilitates the exchange of information and transactions between users across the globe. Access to content is sometimes restricted to a group of one or more users having proper access credentials. For example, a content item distribution system can require that a user log in using a username and password prior to providing access to a requested content item. Other content items are made publicly available and do not require proper credentials for access.

SUMMARY

In general, one innovative aspect of the subject matter described in this specification can be embodied in methods that include the actions of receiving, at a user device, first content transmitted by a first system; in response to receiving the first content, generating, by the user device, a request for second content; transmitting the request for the second content to a second system; determining, by the user device, whether the second content has successfully loaded; and in response to determining that the second content has not been successfully loaded by the user device, executing code included as part of the first content to cause a display of main display content. Other embodiments of this aspect include corresponding systems, apparatus, and computer programs, configured to perform the actions of the methods, encoded on computer storage devices.

These and other embodiments can each optionally include one or more of the following features. The first content can include preliminary content and main content and the functions of generating and transmitting the request for the second content can be performed in response to execution of the preliminary content by an application running on the user device. The first system and the second system can be the same system. The second system can be a restricted access system that requires proper access credentials for accessing the second content. The main display content can include a username and password for the second system. A request for third content that causes a display of a login page for the second system can be generated. The request for the third content can be transmitted to the second system. The second content can include an image file. Third content transmitted by a third system can be received at the user device. A request for fourth content can be generated in response to receiving the third content. The request for the fourth content can be transmitted to a fourth system. A determination as to whether the fourth content has successfully loaded can be made. Presentation of primary display content included as part of the third content can be bypassed in response to determining that the fourth content has successfully loaded.

Particular embodiments of the subject matter described in this specification can be implemented so as to realize none, one or more of the following advantages. A user can be identified as an authenticated user of a system requiring proper authentication without the need for integration into the system. Authenticated users of a system can be quickly and efficiently identified without the need for access to the system. Authenticated users of a system can be readily identified using a technique that requires a relatively low amount of development time. Access credentials for an authenticated system can be readily provided to a user who is not logged-in to the authenticated system and who may or may not have ready access to the access credentials. Authenticated users can be restricted from accessing content that is intended for the general public, but not for authenticated users. A user can be identified as an authenticated user of a particular system without requiring access to information for the user.

In some cases, placing access restrictions on a publicly available resource may be desirable to prevent employees of a company that controls access to the publicly available resource from accessing the publicly available resource. For example, a public resource can be a webpage that allows customers of a particular service to rate the service or otherwise provide feedback related to the service. It may be desirable to prevent employees or other of the company that provides the service (or other authenticated users) from accessing the publicly available resource so that rating or feedback information is not improperly skewed based on input from the employees of the company. In this example, users identified as authenticated users can be further identified as employees of the company and therefor restricted from accessing otherwise publicly available resources.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A content publisher (e.g., a publisher of a website) can provide content in the form of publisher resources (e.g., web pages) to user devices that have requested resources from the content publisher. For example, a user can enter a URL into a web browser running on a personal computer (or another computing device, such as a tablet or mobile device) to cause the personal computer to generate a request for a resource located at the URL and transmit the request to the URL. In response to receiving the request, a web server of a content publisher associated with the URL can provide the requested resource (e.g., a web page) to the personal computer.

In some implementations, access to a resource is restricted. For example, a content publisher can restrict access to a particular resource to a set of users who have provided proper access credentials. A restricted access system can, for example, require that a user provide a user name and password to log-in to the restricted access system before the restricted access system provides access to a requested resource. As another example, a restricted access system can provide access to a restricted access resource only to devices that are located within a particular firewall or local area network. As another example, access to a restricted access resource can be restricted to devices having an IP address included within a pre-identified set of IP addresses.

A resource that is accessible without the need to provide access credentials can be referred to as a public resource while a resource that is only accessible if proper access credentials are provided can be referred to as a restricted resource. In some implementations, a content publisher can provide both restricted resources and public resources. For example, the content publisher can allow access to a public resource without requiring any access credentials. In turn, the content publisher can restrict access to a second resource to only authenticated users (e.g., users that have logged in to a network using access credentials).

In some implementations, a user of a user device can be identified as an authenticated user that has properly logged in to a system (e.g., using a login name and password to log in to the system). The user can be prevented from accessing one or more resources that are otherwise publicly available due to the user being an authenticated user. For example, a system can receive a request for a resource. The system can provide code to a user device that initiated the request that can identify whether or not the user device is an authenticated user device that is logged into the system (or, in some implementations, a different system). If the request has come from an authenticated user device, the provided code can prevent the authenticated user device from accessing the requested resource. The system can then receive a second request for the same resource. The system can provide code to a second user device that initiated the second request that can identify whether or not the second user device is an authenticated user device that is logged into the system. If the request has come from a user device that is not an authenticated user device, the code can provide access to the requested resource so that the requested resource is presented to a user of the second user device.

In some implementations, the system can provide preliminary content in response to a request for a resource. The preliminary content can be, for example, html code that is loaded and executed by a browser of the requesting user device. The preliminary content can include code that attempts to load a file (such as an image file) that is a restricted resource. The file can be, for example, stored by a secured system, or stored within a restricted portion of a system (e.g., behind a firewall). If the file is properly loaded to the user device, the user device is identified as an authenticated user device. If the file does not properly load to the user device, the user device is identified as not being an authenticated user device. In some implementations, the preliminary content generates a request for the originally requested resource only if the user device is not an authenticated user device (i.e., the restricted resource did not properly load).

In some implementations, the requested resource is provided along with the preliminary content in response to the initial request for the requested resource. For example, the preliminary content can be code that is inserted as part of the requested resource and provided along with the requested resource to the requesting device. The inserted preliminary content can include code that, when executed, attempts to load a file (such as an image file) that is a restricted resource. The file can be, for example, stored by a secured system, or stored within a restricted portion of a system (e.g., behind a firewall). If the file is properly loaded to the user device, the user device is identified as an authenticated user device. If the file does not properly load to the user device, the user device is identified as not being an authenticated user device.

If the user device is identified as an unauthenticated user device, then the inserted preliminary content allows the rest of the requested resource to be presented to the user. If the user device is identified as an authenticated user device, the inserted preliminary content prevents the requested resource from being loaded and displayed or otherwise provided to the user of the user device.

Figure 1:
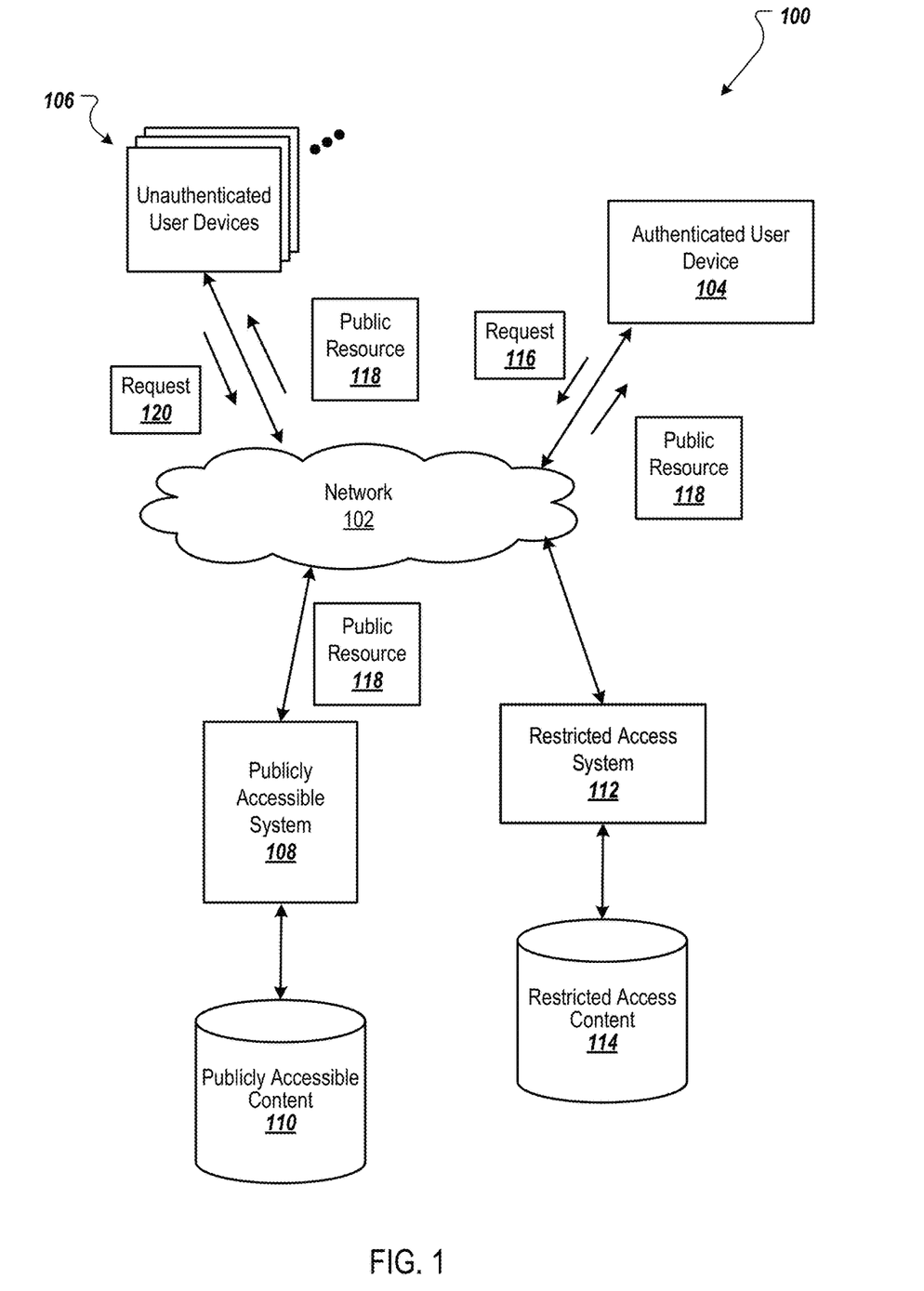
FIG. 1 is a block diagram of an example environment in which authenticated users of a system can be identified.

FIG. 1 is a block diagram of an example environment 100 in which authenticated users of a system can be identified. The example environment 100 includes a network 102, such as a local area network (LAN), a wide area network (WAN), the Internet, or a combination thereof. The network 102 can, for example, connect resource publishers (e.g., web pages) with user devices (e.g. an authenticated user device 104 and unauthenticated user devices 106). User devices can include personal computers, mobile phones, tablet devices, PDAs, television box top controllers, GPS devices, or smart watches.

The example environment 100 may further include a publicly accessible system 108 that provides access to publicly accessible content 110 and a restricted access system 112 that provides access to restricted access content 114. In some implementations, the publicly accessible system 108 and the restricted access system 112 can be part of the same system or in communication with each other. In some implementations, the publicly accessible system 108 can provide access to both publicly accessible content 110 and other restricted access content. In some implementations, the restricted access system 112 can provide access to the restricted access content 114 as well as other publicly accessible (non-restricted access) content.

The publicly accessible system 108 can be, for example, a website associated with a domain name and hosted by one or more servers. The publicly accessible content 110 can be, for example, web pages and other resources provided by the website. An example website is a collection of web pages formatted in hypertext markup language (HTML) that can contain text, images, multimedia content, and programming elements, such as scripts. Each website is maintained by a publisher, which is an entity that controls, manages and/or owns the website. The restricted access system 112 can also be, for example, a website associated with a different domain name and hosted by one or more servers. The restricted access content 114 can be, for example, web pages and other resources provided by the restricted access system 112.

The publicly accessible content 110 and the restricted access content 114 are resources that include any data that can be provided over the network 102. A resource is identified by a resource address that is associated with the resource. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts). Units of content that are presented in (or with) resources are referred to as content items, and an individual content item can be stored in a single file or set of files independent of the resource. In some implementations, multiple content items can be stored in a single file.

A user device (such as the authenticated user device 104 and the unauthenticated user devices 106) is an electronic device that is capable of requesting and receiving resources over the network 102. Example user devices include personal computers, mobile communication devices, and other devices that can send and receive data over the network 102.

A user device typically includes a user application, such as a web browser, to facilitate the sending and receiving of data over the network 102.

The publicly accessible system 108 can initiate processes and methods to distinguish user devices that are authenticated from user devices that are unauthenticated with respect to one or more particular systems. For example, the publicly accessible system 108 can provide code to user devices (e.g., the authenticated user device 104 and the unauthenticated user devices 106) that when executed is able to identify that the authenticated user device 104 is authenticated with respect to the restricted access system 112 and that the unauthenticated user devices 106 are not authenticated with respect to the restricted access system 112.

The authenticated user device 104 can submit a resource request 116 that requests a public resource 118 from the publicly accessible system 108. As described above, the public resource 118 can be made up of one or more content items from the publicly accessible content 110, as well as one or more additional content items stored at other locations. The requested public resource 118 can be, for example, a home page of a website, a web page from a social network, or another resource. The public resource 118 includes both main content and preliminary content. The main content can be content that a user of a requesting device (such as the authenticated user device 104) wishes to access. For example, the main content can be information for displaying a webpage or other information. The preliminary content can be content that is included as part of the public resource 118 that is executed prior to the main content being executed and/or loaded by the requesting device. For example, the preliminary content can be executable code that is included in the public resource 118 that, when executed (e.g., by a web browser or other application of the requesting device), determines if the device is an authenticated user device, and only allows the main content to be presented if the device is not an authenticated device.

In some implementations, the preliminary content is added to the public resource 118 by the publicly accessible content 110. For example, the publicly accessible system 108 can add the preliminary content (e.g., executable code) to the beginning of the public resource 118 to so that the preliminary content is executed prior to the main content of the public resource 118. In some implementations, the preliminary content is added to the public resource 118 prior to the request 116 being received. In some alternative implementations, the preliminary content is added to the public resource 118 at the time that the request 116 is received by the publicly accessible system 108. For example, the publicly accessible system 108 can receive the request 116, identify the public resource 118 within the store of publicly accessible content 110 as satisfying the request 116, identify the public resource 118 as a resource to which access is restricted to only unauthenticated users, add the preliminary content to the public resource 118, and then provide the modified public resource 118 to the authenticated user device 104. In some implementations, the preliminary content is included in the public resource 118 at the time that the public resource 118 is created (e.g., by a content developer that initially created the public resource 118).

In some implementations, the preliminary content is included as part of the public resource 118 if the public resource 118 is a resource to which access is restricted to only unauthenticated users. In other words, the public resource 118 is generally publicly available, but authenticated users are prevented from accessing the public resource 118. For example, the public resource 118 can be a webpage that allows customers of a particular service to rate the service or otherwise provide feedback related to the service. It may be desirable to prevent employees of a company that provides the service from accessing the public resource 118 so that rating or feedback information is not improperly skewed. In this example, user devices that are authenticated can be identified as belonging to employees of the company while unauthenticated user devices can be identified as belonging to non-employees. Distinguishing authenticated user devices from unauthenticated user devices allows the preliminary content included in the public resource 118 to allow the main content to be presented to general users, including customers, while preventing the main content from being presented to employees.

Upon receiving the public resource 118, a web browser or other application running on the authenticated user device 104 can begin executing code included in the public resource 118. For example, the preliminary content included in the public resource 118 can be HTML code that is executed by a web browser of the authenticated user device 104. Execution of the preliminary content can cause the authenticated user device 104 to generate a request for a restricted resource and transmit the request for the restricted resource to the restricted access system 112 (e.g., through the network 102). For example, the preliminary content can be html code that is loaded by a web browser running on the authenticated user device 104. The html code can cause the authenticated user device 104 to generate a request for the restricted resource and transmit the request through the network 102 to the restricted access system 112.

The restricted resource can be stored as part of the restricted access content 114. In some implementations, the restricted resource is an image file (e.g., a .jpg, .gif, .png, or .tif file). In some implementations, the restricted resource is another file type, such as, for example a PDF document, a text file, an HTML file, or a document. In some implementations, the restricted resource is made up of two or more files in combination.

The restricted access system 112 receives the request for the restricted resource from the authenticated user device 104 and identifies that the request is for the restricted resource. The restricted access system 112 can check access credentials of the authenticated user device 104 to determine if the authenticated user device 104 is permitted to access the restricted access system 112. The access credentials can be, for example, transmitted along with the request for the restricted resource. As another example, the restricted access system 112 can identify a network address (e.g., IP address) of the authenticated user device 104 and determine if the authenticated user device 104 is logged-in to the restricted access system 112. For example, a user of the authenticated user device 104 may have previously logged-in to the restricted access system 112 using a username and password. When the request for the restricted resource is received by the restricted access system 112, the restricted access system 112 can identify that the request originated with the authenticated user device 104 and that the user of the authenticated user device 104 had previously logged-in to the restricted access system 112 from the authenticated user device 104 and therefore that the authenticated user device 104 is an authenticated device and permitted to access content provided by the restricted access system 112.

As another example, the restricted access system 112 can determine that the authenticated user device 104 is an authenticated device by identifying that the authenticated user device 104 is located within a particular network. For example, the authenticated user device 104 and the restricted access system 112 may be located behind a specified firewall.

Upon determining that the authenticated user device 104 is an authenticated device, the restricted access system 112 retrieves the requested restricted resource from the store of restricted access content 114 and provides the restricted resource to the authenticated user device 104. For example, the restricted resource can be an image file. The restricted access system 112 can determine that the authenticated user device 104 is an authenticated device and is permitted to access the image file. The restricted access system 112 can retrieve the image file from the store of restricted access content 114 and provide the image file to the authenticated user device 104 through the network in response to the request. In some implementations, the preliminary content executed by the authenticated user device 104 causes the received restricted resource to load. For example, the restricted resource can be an image and the preliminary content can load the image upon receipt of the restricted resource from the restricted access system 112. In some implementations, the preliminary content can cause the image to load (e.g., be rendered) in the background so that the image is not actually displayed by the authenticated user device 104.

The preliminary content executed by the authenticated user device 104 can cause the authenticated user device 104 to identify that the restricted resource successfully loaded (either by being presented by the authenticated user device 104 or by successfully loading in the background). For example, if the restricted resource is an image file, the preliminary content causes the authenticated user device 104 to identify whether the image file was successfully loaded by the authenticated user device 104 or whether an error occurred when the authenticated user device 104 attempted to load the image. The successful loading of the restricted resource by the authenticated user device 104 indicates that the authenticated user device 104 is an authenticated device with respect to the restricted access system 112. In other words, the successful loading of the restricted resource by the authenticated user device 104 indicates that the authenticated user device 104 was permitted to access the restricted resource and therefore had proper access credentials for accessing the restricted access system 112, which in turn indicates that the authenticated user device 104 is an authenticated device (with respect to the restricted access system 112).

In response to identifying that the authenticated user device 104 is an authenticated device, the preliminary code can prevent the authenticated user device 104 from presenting the main content of the public resource 118. In some implementations, in place of the main content, the preliminary content can cause an error message to be displayed to the user of the authenticated user device 104. For example, if the restricted access system 112 is called "Example System," the preliminary content can cause the authenticated user device 104 to display a message reading "You are not permitted to access the requested content because you are an authenticated user of Example System."

Still referring to FIG. 1, one of the unauthenticated user devices 106 can submit a resource request 120 that requests the public resource 118 from the publicly accessible system 108. As described above, the public resource 118 can be made up of one or more content items from the publicly accessible content 110, as well as one or more additional content items stored at other locations. The requested public resource can be, for example, a home page of a website, a web page from a social network, or another resource. The public resource 118 includes both the main content and the preliminary content. The main content can be content that a user of a requesting device (such as the unauthenticated user device 106) wishes to access. For example, the main content can be information for displaying a webpage or other information. The preliminary content can be content that is included as part of the public resource 118 that is executed prior to the main content being executed and/or loaded by the requesting device. For example, the preliminary content can be executable code that is included in the public resource 118 that, when executed (e.g., by a web browser or other application of the requesting device), determines if the device is an authenticated user device, and only allows the main content to be presented if the device is not an authenticated device.

In some implementations, the preliminary content is included as part of the public resource 118 if the public resource 118 is a resource to which access is restricted to only unauthenticated users. In other words, the public resource 118 is generally publicly available, but authenticated users are prevented from accessing the public resource 118. For example, the public resource 118 can be a webpage that allows customers of a particular service to rate the service or otherwise provide feedback related to the service and it may be desirable to prevent employees of a company that provides the service from accessing the public resource 118.

Upon receiving the public resource 118, a web browser or other application running on the unauthenticated user device 106 can begin executing code included in the public resource 118. For example, the preliminary content included in the public resource 118 can be HTML code that is executed by a web browser of the unauthenticated user device 106. Execution of the preliminary content can cause the unauthenticated user device 106 to generate a request for a restricted resource and transmit the request for the restricted resource to the restricted access system 112 (e.g., through the network 102). For example, the preliminary content can be html code that is loaded by a web browser running on the unauthenticated user device 106. The html code can cause the unauthenticated user device 106 to generate a request for the restricted resource and transmit the request through the network 102 to the restricted access system 112.

The restricted access system 112 receives the request for the restricted resource from the unauthenticated user device 106 and identifies that the request is for the restricted resource. The restricted access system 112 can check access credentials of the unauthenticated user device 106 to determine if the unauthenticated user device 106 is permitted to access the restricted access system 112. For example, the restricted access system 112 can identify whether proper access credentials have been provided by the unauthenticated user device 106 along with the request for the restricted resource. As another example, the restricted access system 112 can identify a network address (e.g., IP address) of the unauthenticated user device 106 and determine if the unauthenticated user device 106 is logged-in to the restricted access system 112. As another example, the restricted access system 112 can determine whether the unauthenticated user device 106 is an authenticated device by identifying whether the unauthenticated user device 106 is located within a particular network. For example, the restricted access system 112 can identify all devices located behind a specified firewall with the restricted access system 112 as being authenticated devices.

In the example shown in FIG. 1, the unauthenticated user device 106 is an unauthenticated device with respect to the restricted access system 112 and therefore is not currently logged-in to the restricted access system 112 or does not otherwise possess proper access credentials for accessing the restricted access system 112. Upon determining that the unauthenticated user device 106 is not an authenticated device, the restricted access system 112 denies access to the restricted resource.

The preliminary content, when executed by the unauthenticated user device 106, causes the unauthenticated user device 106 to identify that the restricted resource was not properly loaded by the unauthenticated user device 106. For example, an error can occur when the unauthenticated user device 106 attempts to load the restricted resource. The failure of the restricted resource to load indicates that the unauthenticated user device 106 is not an authenticated device. The restricted resource fails to load due to access to the restricted resource not being provided to the unauthenticated user device 106 by the restricted access system 112 in response to the request for the restricted resource. Failure to receive the restricted resource in response to the request for the restricted resource can be identified as an indication that the unauthenticated user device 106 is not an authenticated device.

In response to identifying that the unauthenticated user device 106 is not an authenticated device, the preliminary code can cause the main content included in the public resource 118 to be executed or otherwise presented to a user of the unauthenticated user device 106. The preliminary content allows the main content to be presented to the user as only authenticated devices are prevented from accessing the main content.

In some implementations, instead of providing the public resource 118, that includes the preliminary content and main content, to the authenticated user device 104 and the unauthenticated user device 106 in response to the requests 116 and 120, the publicly accessible system 108 provides only the preliminary content to the respective requesting device and does not provide the main content. For example, the publicly accessible system 108 receives the request 116 requesting the public resource 118, and provides the preliminary content in response to the request 116. The preliminary content, when executed by a requesting device, causes a request for the restricted resource to be generated and transmitted to the restricted access system 112 as described above. The preliminary content then determines whether or not the requesting device is an authenticated device based on whether or not the restricted resource is successfully retrieved and/or properly loads (as described above). If the restricted content is successfully retrieved and/or successfully loads, the requesting device is identified as an authenticated device. If the restricted content is not successfully retrieved and/or does not successfully load, the requesting device is identified as an unauthenticated device.

If the requesting device is identified as an unauthenticated device, the preliminary code causes the requesting device to generate a request for the main content. The request is then transmitted to the publicly accessible system 108 and the main content is returned in response to the request. The requesting device then executes the main content or otherwise presents the main content to a user of the requesting device. If the requesting device is identified as an authenticated device, the preliminary content does not cause the requesting device to generate a request for the main content. The main content is therefore not provided to the requesting device or presented to the user of the requesting device. In some implementations, if the requesting device is identified as an authenticated device, an error message or other substitute content is presented in place of the main content.

In some implementations, access to the public resource 118 and the restricted resource can be managed by a single system rather than by two separate systems as depicted in FIG. 1. For example, the publicly accessible system 108 can manage access for both the publicly accessible content 110 and the restricted access content 114. In such implementations, requests for both the public resource 118 and the restricted resource are handled by the publicly accessible system 108 rather than by two separate systems. In some implementations, the publicly accessible system 108 and the restricted access system 112 are distinct systems and the publicly accessible system 108 does not have proper access credentials for the restricted access system 112 or is otherwise unable to access the restricted access system 112 to access some or all of the restricted access content 114.

In some implementations, a determination as to whether a user device is an authenticated user device is made by a system or computing device other than the user device. For example, the publicly accessible system 108 can be configured to determine if user devices that are requesting resources from the publically accessible system 108 are authorized or unauthorized devices. In this example, the publicly accessible system 108 can receive a request for a first resource from a user device. In response to receiving the request, the publicly accessible system 108 can determine if the requesting user device is permitted to access a restricted resource. For example, the publicly accessible system 108 can determine if the requesting device has proper credentials for accessing restricted resource that is hosted by the restricted access system 112. As another example, the publicly accessible system 108 can determine if the requesting device is permitted to access a restricted resource that is controlled by the publicly accessible system 108.

If the publicly accessible system 108 determines that the requesting device is not permitted to access the restricted resource, the publicly accessible system 108 can then identify the requesting device as an unauthenticated device and provide the first resource to the requesting device (in response to the request). If the publicly accessible system 108 determines that the requesting device is permitted to access the restricted resource, the publicly accessible system 108 can deny access to the first resource, and not return the first resource to the requesting device in response to the request.

In some implementations, a user device can generate a request for the restricted content controlled by the restricted access system 112 prior to sending a request for the public resource 118 to the publicly accessible system 108. For example, the authenticated user device 104 can generate a request for restricted content and transmit the request to the restricted access system 112 prior to sending the request 116 for the public resource 118 to the publically accessible system 108. The above described processes for determining if the authenticated user device 104 is authenticated or unauthenticated can be performed prior to the request 116 being transmitted.

Figure 2:
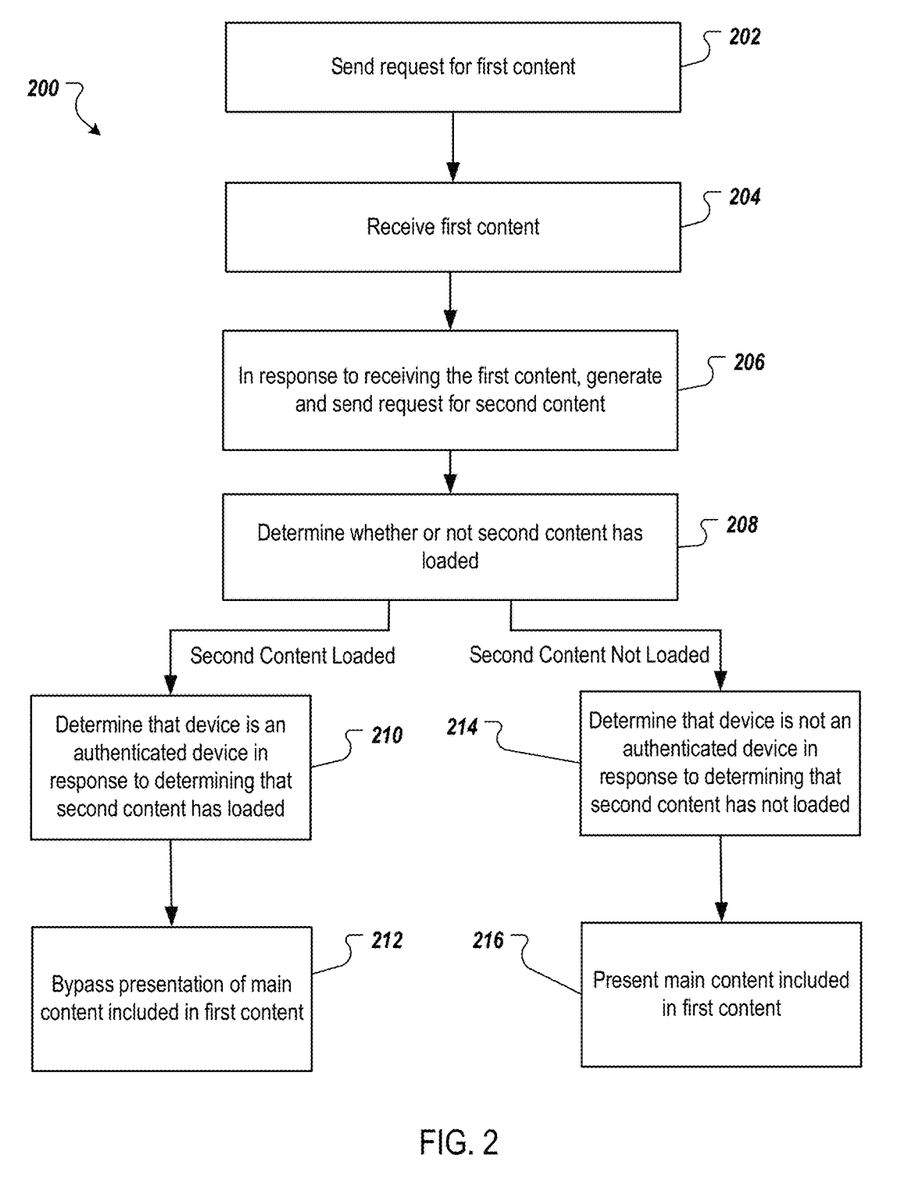
FIG. 2 is a flow chart of an example process for managing access to public content.

FIG. 2 is a flow chart of an example process 200 for managing access to public content. The process 200 can be performed by one or more data processing apparatus, such as the authenticated user device 104, one of the unauthenticated user devices 106, or another data processing apparatus. Operations of the process 200 can be implemented by execution of instructions stored on a non-transitory computer readable medium. Execution of the instructions causes one or more data processing apparatus to perform operations of the process 200.

A request for first content is sent (202). The request can be generated and transmitted, for example, by a user device such as the authenticated user device 104 or one of the unauthenticated user devices 106. The request can be generated, for example, by a web browser or other program running on a user device (such as a personal computer, mobile phone, etc.). For example, the request can be generated by a mobile application installed on a smart phone. The first content can be one or more resources such as a web page, image, PDF, or other electronic file or combination of files. The request can be received through a network, such as the network 102. In some implementations, the request is generated in response to a user selecting a hyperlink displayed as part of a web page, email, or other file. In some implementations, the request is generated in response to a user entering a URL or other network address into a web browser or other application.

The first content is received (204). For example, the request for the first content can be transmitted to a system, such as the publicly accessible system 108, and in return, the system can provide the first content to the requesting device. The first content can include preliminary content and main content. The main content can be content that a user of a requesting device (such as the authenticated user device 104) wishes to access. For example, the main content can be information for displaying a webpage or other information to a user. The preliminary content can be content that is included as part of the first content that is executed prior to the main content being executed and/or loaded by the requesting device. For example, the preliminary content can be executable code that is included in the first content that, when executed (e.g., by a web browser or other application of the requesting device), determines if the device is an authenticated user device, and only allows the main content to be presented if the device is not an authenticated device.

In response to receiving the first content, a request for second content is generated and sent (206). For example, preliminary content included as part of the first content can, when executed by the user device, cause the user device to generate a request for the second content. The preliminary content can be, for example, HTML code, a script, or other executable code that can be executed by a web browser or other application running on the user device that initiated the request for the first content.

The second content can be restricted content that is only accessible by authenticated devices. In some implementations, access to the second content is controlled by the same system that received the request for access to the first content at 202 and/or provided the first content at 204. In some alternative implementations, access to the second content is controlled by a system that is distinct from the system that received the request the first content at step 202. In some implementations, the second content is an image file. In some implementations, the second content is another type of file such as a text document, PDF, or video file. In some implementations, the preliminary content executed by the user device can cause the user device to attempt to load the second content "in the background" without displaying the second content to a user of the user device.

The request for the second content can be transmitted to a restricted access system, such as, for example, the restricted access system 112. Since the second content is restricted content, the system that receives the request for the second content may only provide the second content to the user device if the device is an authenticated device. If the user device is not an authenticated device, access to the second content is denied.

A determination as to whether or not the second content successfully loaded is made (208). For example, if the second content is not successfully retrieved or loaded by the user device, an error can occur to indicate that the second content did not successfully load. As another example, if the second content is successfully loaded by the user device, no error occurs, or in some implementations, an indication that the second content successfully loaded can be provided. In some implementations, the preliminary content attempts to load the second content in the background, such that if the second content is successfully loaded, the second content is not actually presented to a user of the user device. In some implementations, the second content is presented by the user device.

If the second content has successfully loaded, a device that initiated the request for the first content is determined to be an authenticated device (210). For example, a user of the device has proper access credentials for accessing the second content (the second content being restricted content) and is therefore an authenticated user. The proper access credentials can be, for example, a username and password for logging-in to a system that controls access to the second content. The user can enter the username and password to log in to the system and receive access to the second content. In other implementations, the device can be identified as being an authenticated device in another manner. For example, the device may have a network address that is identified as belonging to an authenticated device. As another example, the device can provide proper access credentials along with the request for second content sent at step 206.

Upon determining that the device is an authenticated device, presentation of the main content included in the first content is bypassed (212). For example, the preliminary content can prevent the main content included in the first content from being presented to a user of the user device. For example, the main content can be information for causing a display of a web page. The preliminary content can, upon determining that the device is an authenticated device, prevent the main content from executing, thereby bypassing presentation of the web page. In some implementations, an error message or other substitute content is presented in place of main content.

If the second content does not successfully load, a device that initiated the request for the first content is determined to not be an authenticated device (214). For example, a user of the device does not possess a proper username and password for logging into a system that controls access to the second content. Since the user cannot log in to the system, an error occurs when the device attempts to load the second content. This error indicates that the device is not an authenticated device. As another example, the device does not provide proper access credentials along with the request for the second content, or prior to transmitting the request for the second content. The second content is restricted content, and is therefore not provided in response to the request since the device has not provided proper access credentials for accessing the second content. Since the second content is not provided in response to the request for the second content, the second content is not successfully loaded and the device is identified as an unauthenticated device.

Upon determining that the device is not an authenticated device, the main content included in the first content is presented (216). For example, the preliminary content can identify that the second content has successfully loaded and in response allow the main content to be executed or otherwise presented by the device. For example, the main content can be information for causing a display of a web page. The preliminary content can, upon determining that the device is no an authenticated device, allow the main content to be executed (e.g., by a web browser of the device) to cause the web page to be displayed to a user of the device.

Figure 3:
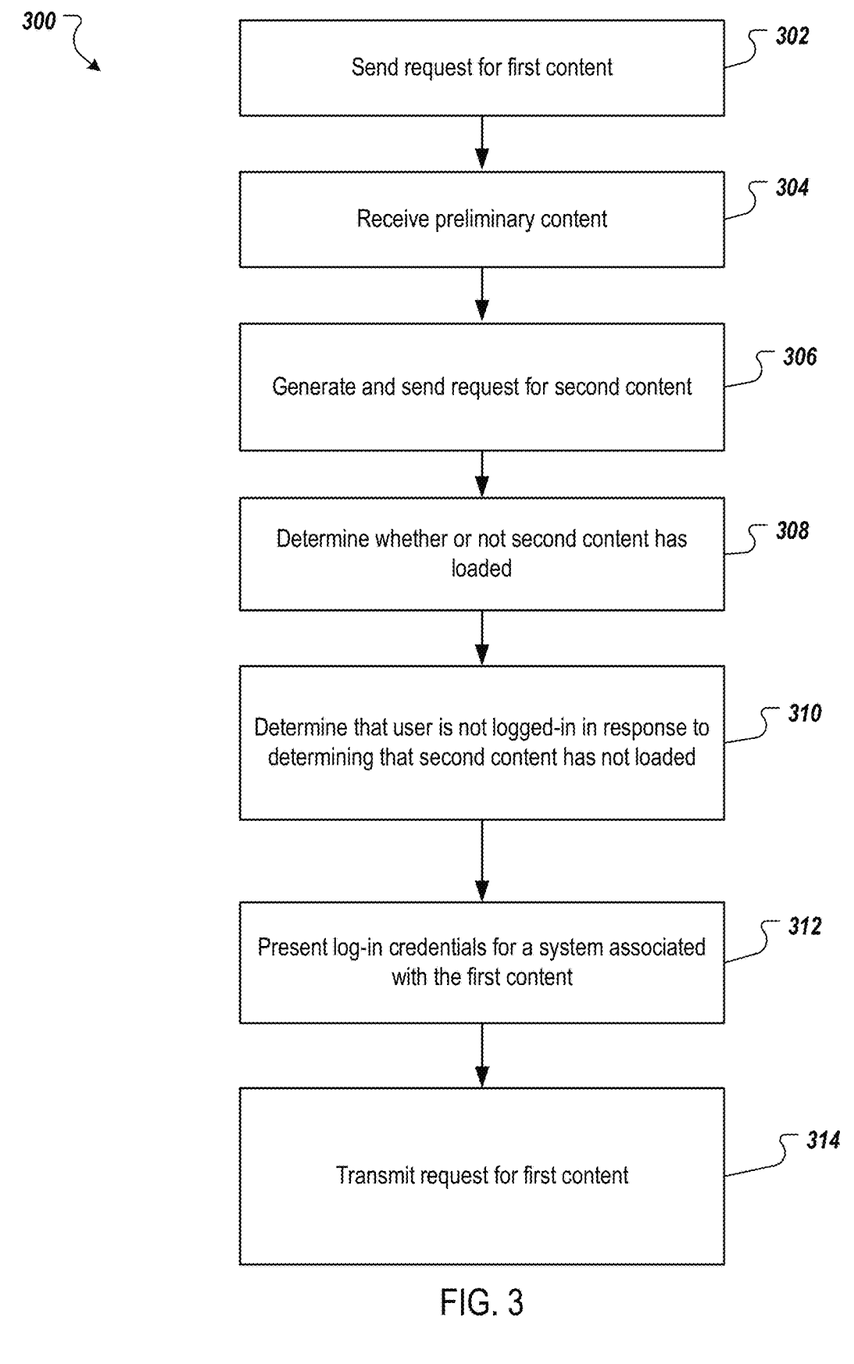
FIG. 3 is a flow chart of an example process for providing log-in credentials to a user.

FIG. 3 is a flow chart of flow chart of an example process 300 for providing log-in credentials to a user. The process 300 can be performed by one or more data processing apparatus, such as the authenticated user device 104, one of the unauthenticated user devices 106, or another data processing apparatus. Operations of the process 300 can be implemented by execution of instructions stored on a non-transitory computer readable medium. Execution of the instructions causes one or more data processing apparatus to perform operations of the process 300.

A request for first content is sent (302). The request can be generated and transmitted, for example, by a user device such as one of the unauthenticated user devices 106. The request can be generated, for example, by a web browser or other program running on a user device (such as a personal computer, mobile phone, etc.). For example, the request can be generated by a mobile application installed on a smart phone. The first content can be one or more resources such as a web page, image, PDF, or other electronic file or combination of files. The request can be received through a network, such as the network 102. In some implementations, the request is generated in response to a user selecting a hyperlink displayed as part of a web page, email, or other file. In some implementations, the request is generated in response to a user entering a URL or other network address into a web browser or other application. In some implementations, the first content can be a information for causing presentation of a login screen for a computer system. The login screen can allow a user of the device to access the system by entering a username and password. For example, the user of the user device can be an employee of or otherwise associated with a company or other entity that possess an account with the system. The account can be shared among multiple employees or other persons. Each of the employees or other persons can access the account using the same login name and password. For example, the system can provide access to a subscription only service and a company can purchase a single account for the subscription service. A login name and password are associated with the account, and employees of the company can login to the account using the username and password.

Preliminary content is received (304). For example, as discussed above, the first content can be information that causes the presentation of a login screen that allows users to log in to a system. The request for the first content can be intercepted, for example, by a gateway server of a local area network to which the device is connected, and the preliminary content can be provided in response to the intercepted request. The preliminary content can be executable code that can, when executed (e.g., by a web browser or other application of the requesting device), determine if the device is currently logged-in to a particular system. In some implementations, rather than being intercepted by a different entity, the device on which the request for the first content was initiated delays sending the request for first content and instead access and execute the preliminary content prior to transmitting the request for the first content. For example, a monitoring program running on the device can monitor the activity of other programs to determine if another program (e.g., a web browser) running on the device has initiated a request for the first content. The monitoring program can delay transmission of the request for the first content and instead cause the preliminary content to be executed by the device.

A request for second content is generated and sent (306). For example, preliminary content received at step 304 (or accessed by a monitoring program as described above), when executed by the user device, causes the user device to generate a request for the second content. The preliminary content can be, for example, HTML code, a script, or other executable code that can be executed by a web browser or other application running on the user device that initiated the request for the first content.

The second content can be restricted content that is only accessible by a device that is currently logged in to a particular system. In some implementations, access to the second content is controlled by the same system that controls access to the first content. For example, the first content can be information that causes presentation of a login page for a restricted access system. The second content can be an image file or other file stored behind a firewall of the restricted access system and only accessible to devices that are logged-in to the restricted access system. In some alternative implementations, access to the second content is controlled by a system that is distinct from the system that controls access to the first content. In some implementations, the second content is an image file. In some implementations, the second content is another type of file such as a text document, PDF, or video file. In some implementations, the preliminary content executed by the user device can cause the user device to attempt to load the second content "in the background" without displaying the second content to a user of the user device.

The request for the second content can be transmitted to a restricted access system, such as, for example, the restricted access system 112. Since the second content is restricted content, the system that receives the request for the second content may only provide the second content to the user device if the device is an authenticated device (e.g. currently logged in to the system). If the user device is not currently logged in to the system, access to the second content is denied by the system that receives the request (e.g., the system can ignore the request or return an error message indicating that the device that submitted the request is not authorized to access the second content).

A determination as to whether or not the second content successfully loaded is made (308). For example, if the second content is not successfully loaded by the user device, an error can occur to indicate that the second content did not successfully load. As another example, if the second content is successfully loaded by the user device, no error occurs, or in some implementations, an indication that the second content successfully loaded can be provided.

In response to the determination that the second content has not loaded, it is determined that the user is not logged-in (310). For example, if the user of the user device is logged-in to a system that controls access to the second content, the user device is permitted to access the second content, and the second content successfully loads. If the user of the user device is not logged-in to the system that controls access to the second content, the second content is not successfully loaded by the device. The preliminary code can, when executed by the user device, identify that the user device is not currently logged-in to the system that controls access to the second content by identifying that an error has occurred when the user device attempted to load the second content.

Log-in credentials for a system that is associated with the first content are presented by the user device (312). For example, in response to identifying that the second content did not successfully load (and therefore that the user device is not currently logged into the system that controls access to the second content) the preliminary code can cause a display of log-in credentials for the system associated with the first content. For example, a username and password for an account for the system associated with the first content can be displayed to the user of the user device. The user can use the displayed username and password to log-in to the system. In some implementations, if the second content is successfully loaded by the user device (either for presentation to the user or in the background) the log-in credentials (e.g. username and password) are not displayed to the user of the user device.

This process of displaying log-in credentials for a system in response to identifying that a user is not currently logged in to a system can be implemented, for example, in situations in which a single set of log-in credentials are being shared among multiple users. For example, a company can purchase a single subscription to a subscription service. The subscription can include a username and password for logging in to the subscription service. Employees of the company can share this single username and password, but may not have ready access to the shared username and password. Implementing the process 300 can allow the company, in this example, to provide a display of the shared username and password to employees whenever an employee is attempting to access the subscription service.

A request for the first content is transmitted (314). For example, the first content can be a login screen for a system, and the preliminary code can cause the user device to display a username and password for the system. The user can then select a selectable icon displayed along the username and password to proceed to the login screen. This can cause the user device to transmit a request for the login screen (i.e., the first content) and in return receive the first content and display the login screen to the user. The user can then use the previously displayed username and password to log-in to the system using the login screen. This allows the user of the user device to access the username and password without having to memorize or otherwise keep track of the username and password of the system. In some implementations, if it is determined that the second content has successfully loaded at step 308, the user device automatically transmits the request for the first content and the first content is received and presented to the user without the username and password first being presented to the user.

[Note to Inventors: The Following Boilerplate Says the Invention can be Implemented in all Manner of Digital Computer and Circuit Technology.]

Figure 4:
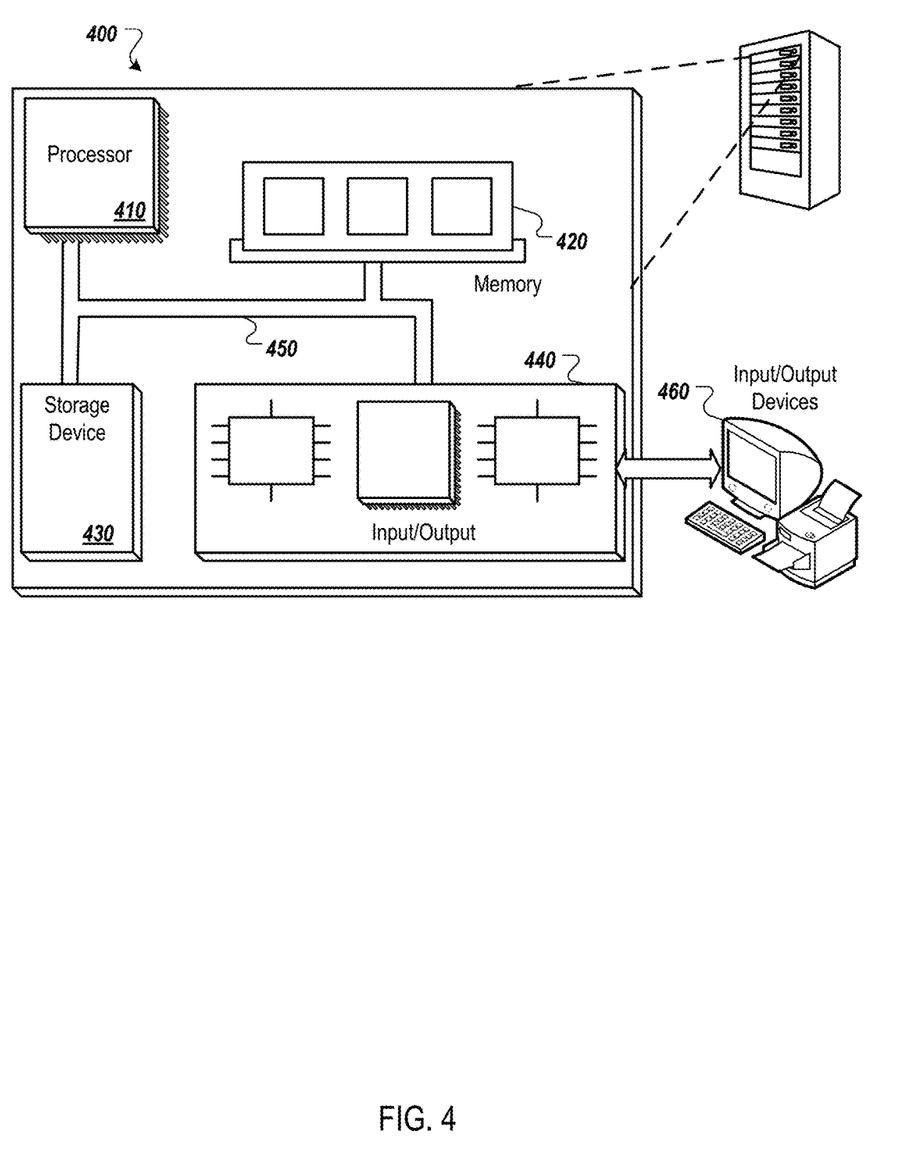
FIG. 4 is a block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous

What is claimed is:

1. A method comprising:
    transmitting, to a first system from a user device, a request for main display content;
    receiving, at the user device, first content transmitted by the first system, wherein the first content includes preliminary content and the requested main display content;
    in response to receiving the first content and executing the preliminary content by an application running on the user device, generating, by the user device, a request for second content;
    transmitting the request for the second content to a second system;
    determining, by the user device, whether the second content has successfully loaded; and
    in response to determining that the second content has not been successfully loaded by the user device, identifying the user device as unauthenticated and further executing code included as part of the preliminary content to cause a display of the main display content, wherein the display of the main display content is allowed by the preliminary content responsive to the user device being identified as unauthenticated.

2. The method of claim 1, wherein the first system and the second system are the same system.

3. The method of claim 1, wherein the second system is a restricted access system that requires proper access credentials for accessing the second content.

4. The method of claim 1, wherein the main display content includes a username and password for the second system.

5. The method of claim 4, further comprising:
    generating a request for third content that causes a display of a login page for the second system; and
    transmitting the request for the third content to the second system.

6. The method of claim 1 wherein the second content comprises an image file.

7. The method of claim 1, further comprising:
    receiving, at the user device, third content transmitted by a third system;
    in response to receiving the third content, generating, by the user device, a request for fourth content;
    transmitting the request for the fourth content to a fourth system;
    determining, by the user device, whether the fourth content has successfully loaded; and
    in response to determining that the fourth content has successfully loaded, bypassing presentation of primary display content included as part of the third content.

8. The method of claim 1, wherein the second content is only accessible by authenticated users.

9. The method of claim 8, wherein the main display content is not displayed if the user is an authenticated user and is permitted to access the second content.

10. The method of claim 1, wherein the request for the second content is transmitted to determine if the user is authorized to access the second system, wherein if the user is authorized to access the second system, the main display content is not displayed to the user.

11. A computer storage medium encoded with a computer program, the program comprising instructions that when executed by data processing apparatus cause the data processing apparatus to perform operations comprising:
    transmitting, to a first system from a user device, a request for main display content;
    receiving, at the user device, first content transmitted by the first system, wherein the first content includes preliminary content and the requested main display content;
    in response to receiving the first content and executing the preliminary content by an application running on the user device, generating, by the user device, a request for second content;
    transmitting the request for the second content to a second system;
    determining, by the user device, whether the second content has successfully loaded; and
    in response to determining that the second content has not been successfully loaded by the user device, identifying the user device as unauthenticated and further executing code included as part of the preliminary content to cause a display of the main display content, wherein the display of the main display content is allowed by the preliminary content responsive to the user device being identified as unauthenticated.

12. The computer storage medium of claim 11, wherein the first system and the second system are the same system.

13. The computer storage medium of claim 11, wherein the second system is a restricted access system that requires proper access credentials for accessing the second content.

14. The computer storage medium of claim 11, wherein the main display content includes a username and password for the second system.

15. The computer storage medium of claim 11, the operations further comprising:
    receiving, at the user device, third content transmitted by a third system;
    in response to receiving the third content, generating, by the user device, a request for fourth content;
    transmitting the request for the fourth content to a fourth system;
    determining, by the user device, whether the fourth content has successfully loaded; and
    in response to determining that the fourth content has successfully loaded, bypassing presentation of primary display content included as part of the third content.

16. The computer storage medium of claim 11, wherein the second content is only accessible by authenticated users and wherein the main display content is not displayed if the user is an authenticated user and is permitted to access the second content.

17. A system comprising:
    a data store storing executable instructions; and one or more computers that interact with the data store and execute instructions that cause the one or more computers to perform operations comprising:

transmitting, to a first system from a user device, a request for main display content;

receiving, at the user device, first content transmitted by the first system, wherein the first content includes preliminary content and the requested main display content;

in response to receiving the first content and executing the preliminary content by an application running on the user device, generating, by the user device, a request for second content;

transmitting the request for the second content to a second system;

determining, by the user device, whether the second content has successfully loaded; and in response to determining that the second content has not been successfully loaded by the user device, identifying the user device as unauthenticated and further executing code included as part of the preliminary content to cause a display of the main display content, wherein the display of the main display content is allowed by the preliminary content responsive to the user device being identified as unauthenticated.

18. The system of claim 17, wherein the first system and the second system are the same system.

19. The system of claim 17, wherein the second system is a restricted access system that requires proper access credentials for accessing the second content.

20. The system of claim 17, wherein the main display content includes a username and password for the second system.

21. The system of claim 17, the operations further comprising:

receiving, at the user device, third content transmitted by a third system;

in response to receiving the third content, generating, by the user device, a request for fourth content;

transmitting the request for the fourth content to a fourth system;

determining, by the user device, whether the fourth content has successfully loaded; and in response to determining that the fourth content has successfully loaded, bypassing presentation of primary display content included as part of the third content.

22. The system of claim 17, wherein the second content is only accessible by authenticated users and wherein the main display content is not displayed if the user is an authenticated user and is permitted to access the second content.

* * * * *